United States Patent [19]

Thompson

[11] 4,095,039

[45] June 13, 1978

[54] POWER CABLE WITH IMPROVED FILLING COMPOUND

[75] Inventor: Paul F. Thompson, Millington, N.J.

[73] Assignee: General Cable Corporation, Greenwich, Conn.

[21] Appl. No.: 677,531

[22] Filed: Apr. 16, 1976

[51] Int. Cl.$^2$ .......................... H01B 7/28; H01B 7/18
[52] U.S. Cl. .............................. 174/23 C; 174/102 D; 174/110 AR; 174/120 SC
[58] Field of Search ...................... 174/23 R, 23 C, 36, 174/102 D, 102 R, 107, 110 B, 110 AR, 120 SC, 120 SR, 116; 156/48, 47; 29/624; 428/375; 378; 390; 396

[56] References Cited

U.S. PATENT DOCUMENTS

| | | | |
|---|---|---|---|
| 3,098,893 | 7/1963 | Pringle et al. | 174/110 B |
| 3,340,112 | 9/1967 | Davis et al. | 174/23 R X |
| 3,479,621 | 11/1969 | Martin | 174/102 D UX |
| 3,589,121 | 6/1971 | Mulvey | 174/23 R X |
| 3,728,466 | 4/1973 | Rocton et al. | 174/23 R |
| 3,872,233 | 3/1975 | Rocton | 174/23 R |
| 3,885,085 | 5/1975 | Bander et al. | 174/120 SC |
| 3,943,271 | 3/1976 | Bander et al. | 174/23 R |
| 3,962,517 | 6/1976 | Verne | 174/120 SC X |

FOREIGN PATENT DOCUMENTS

| | | | |
|---|---|---|---|
| 1,540,564 | 1/1970 | Germany | 174/116 |

OTHER PUBLICATIONS

The Condensed Chemical Dictionary, 8th Edition Van Nostrand, Reinhold 1971 p. 705.

*Primary Examiner*—Arthur T. Grimley
*Attorney, Agent, or Firm*—Roy C. Hopgood; John M. Calimafde; Charles W. Neill

[57] ABSTRACT

Filling compounds for high voltage, electric power transmission cables have been deficient in one characteristic or another, such as incompletely filling voids during manufacture, forming voids when cables are in service, lack of permanent adhesion to cable components to prevent passage of water lengthwise of the cable, and low drip point when cables are at elevated temperatures. This invention is a cable filled with a compound of isobutylene rubber that obtains all of the desirable filler characteristics for a high voltage power transmission cable.

13 Claims, 3 Drawing Figures

POWER CABLE WITH IMPROVED FILLING COMPOUND

BACKGROUND AND SUMMARY OF THE INVENTION

High-voltage power transmission cables have a center conductor surrounded by a semi-conducting shield between the conductor and the insulation of the cable. A semi-conducting shield surrounds the insulation, and there is an outer shield, usually a corrugated metal shield, around the semi-conducting shield of the insulation.

Such transmission lines are subjected to operating conditions not met with in other types of cables. It is important to prevent water or water vapor from gaining access to the insulation. Polyethylene insulation, which is the insulation most commonly used on such cables, is damaged by the formation of electro-chemical trees when moisture is present at regions of high electrical stress in the insulation. The voltages used for high-voltage power transmission lines are such as to cause regions of high electrical stress in the insulation.

Power transmission lines carry much heavier loads when demand is high; and the loads are greatly reduced at other times. This variation in the amount of current flowing through the conductors causes substantial variations in temperature at different times.

This "load cycling" results in expansions and contractions of the cable. When successive layers of the cable construction do not maintain their adhesion to one another, the expansion and contraction of the cable causes cracking at the interfaces of the layers and results in voids in which moisture can accumulate, and travel lengthwise of the cable where the voids intersect one another and provide longitudinal clearance between layers of the cable structure.

It has been the practice to use filler compounds within high voltage power transmission cables to prevent formation of voids and migration of moisture lengthwise of the cable between successive cable layers.

Such fillers or flooding compounds may be satisfactory on new cables; but as the cable ages, the compound may lose its adhesive qualities or may harden and fracture and portions of it may migrate into other layers of the cable, particularly the insulation layer. Such migration may facilitate the formation of electrochemical trees and greatly shorten the useful life of the cable.

There are many fillers and flooding compounds available commercially. I have tested the most promising of these compounds in extensive cable research tests and could not find any compound that had and retained all of the desired characteristics for a high-voltage transmission cable over long periods of time when subject to load cycling; high temperatures encountered under overload conditions; exposure to moisture, particularly at elevated temperatures and aging that tends to reduce adhesiveness and flexibility.

This invention is based on the discovery that certain compounds of isobutylene rubber do provide all of the desirable filler characteristics for a high-voltage power transmission cable. Specific compounds and their correlation in the cable construction will be explained more fully as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
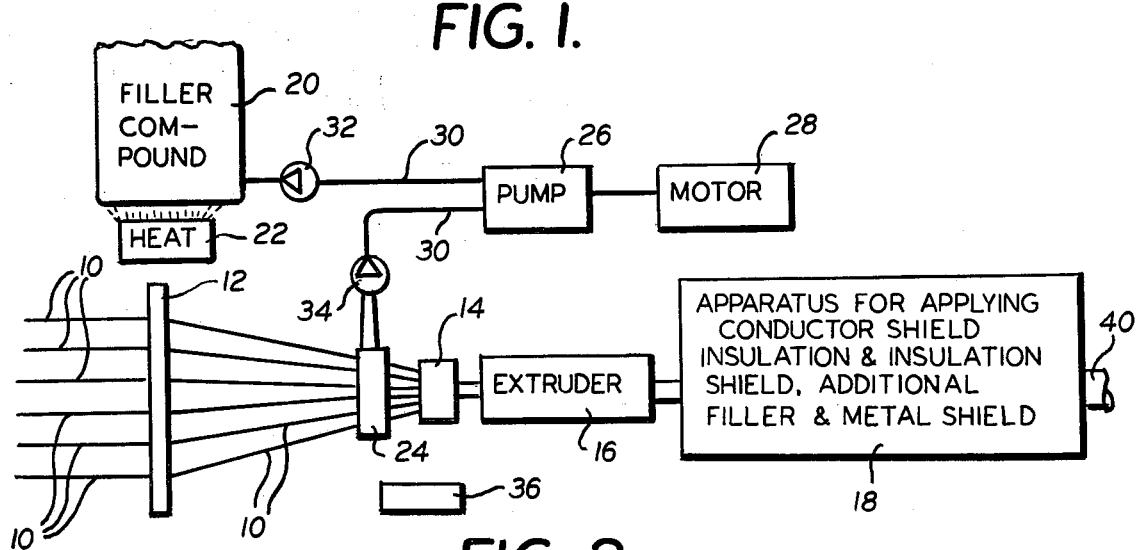
FIG. 1 is a diagrammatic view showing the way in which the compound of this invention is preferably introduced into a stranded conductor of a cable in accordance with this invention.

High voltage power transmission cables are generally made with stranded conductors for greater flexibility. Individual strands designated in FIG. 1 by the reference character 10 are passed through a guide plate 12 to a forming die 14 which brings the strands together. Beyond the forming die 14 the stranded conductor passes through an extruder 16 which is used to apply a semi-conducting plastic shield over the stranded conductor. Beyond the extruder 16, there is other apparatus indicated generally by the reference character 18 and which may be conventional cable-making equipment for applying insulation, an insulation shield, filler or flooding compound and a metallic shield or other outer coating for the cable. This structure is illustrated diagrammatically in FIG. 1, and it will be understood that the stranding machine is ordinarily equipped to give the strands a helical lay, such apparatus being well known and no more detailed description of it being necessary for purposes of this application.

FIG. 1 also shows a container 20 from which the filler of this invention is supplied to the cable. A heater 22 raises the temperature of the compound in the container 20 to a temperature which permits pumping of the filler compound through tubing to a compound applicator 24.

A pump 26 driven by a motor 28 withdraws compound from the container 20 and pumps it through tubing 30 to the applicator 24 through which the strands 10 pass on their way to the forming die 14. Check valves 32 and 34 are preferably provided in the tubing 30. The compound coats the strands 10 in the compound applicator 24, and when the strands are brought together in the forming die 14, the compound fills all spaces between the strands and excess filler material drains from the applicator to a sump 36 from which it is recovered and reused. The finished cable is designated in FIG. 1 by the reference character 40, and FIG. 2 shows a greatly enlarged sectional view of the cable.

Figure 2:
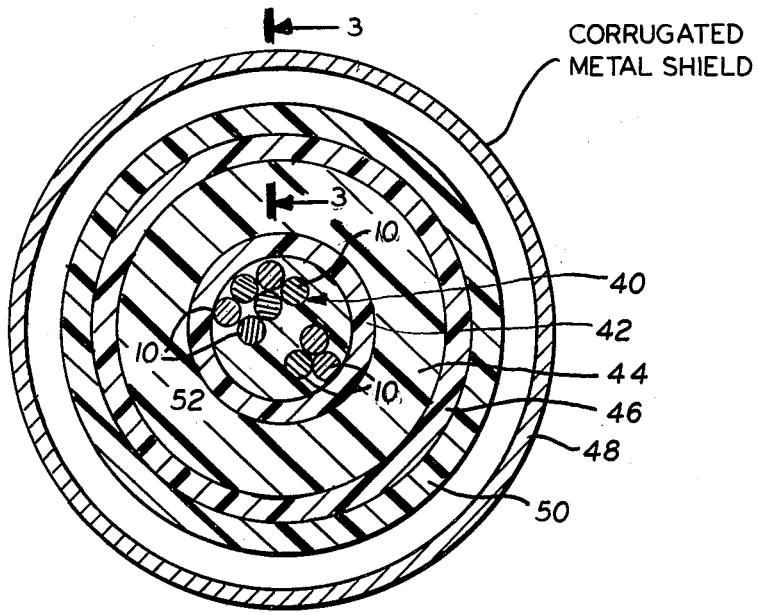
FIG. 2 is a cross-section of a high-voltage power transmission cable using the filler material of this invention.

FIG. 2 shows a stranded conductor 40 to which a semi-conducting conductor shield 42 is applied. A layer of insulation 44, preferably polyethylene, surrounds the conductor shield 42; and there is a semi-conducting insulation shield 46 around the outside of the insulation 44. A corrugated metal shield 48 extends around the other structure of the cable, and there is a layer of filler compound 50 for sealing the space between the insulation shield 46 and the corrugated conductor 48, as will be more fully explained in connection with FIG. 3.

The filler material, that fills all spaces of the stranded conductor 40, is designated in FIG. 2 by the reference character 52. This material is a compound of low molecular weight polyisobutylene rubber or a low molecular weight copolymer of isobutylene-isoprene rubber. To either of these isobutylene rubber materials, 40 to 150 parts by weight of electrical conductive carbon black or graphite material is added for each 100 parts of the isobutylene rubber material.

The addition of this carbon makes the filler material semi-conductive, and it also serves an important function, in that it prevents flow of the isobutylene rubber material at temperatures up to 200° C. Thus the filler material can withstand temperatures encountered during heavy loads on the power transmission lines without softening and having its viscosity become so low that it will flow out of the cable at cable ends or flow lengthwise of the corrugated metal shield at locations where the cable is on a substantial slope.

Some additional material can be added, if necessary, as a processing aid; for example, a hydrocarbon oil, such as used in rubber compounding, or a chlorinated paraffin or isobutylene liquid plasticizer can be used to bring the isobutylene rubber compound to a pumping consistency without utilizing excessive heat. It is preferable, however, to use as little processing air as possible or none at all when it is not necessary for obtaining a pumping consistency.

The disadvantages of the processing aids are that they may migrate into the insulation shield and cause swelling and a consequent reduction in the conductivity of the shield.

The amount of electrical conductive carbon black or graphite material which is mixed with the isobutylene rubber material is from 40 to 150 parts by weight of the carbon to 100 parts of the isobutylene rubber compound; and the preferred range is from 40 to 50 parts of the carbon in order to obtain the desired conductivity.

The filler compound of this invention is of a puttylike consistency at room temperatures, and it has good adhesiveness. One of the outstanding advantages of the filler of this invention is its retention of adhesiveness in spite of repeated heating and cooling resulting from load cycling of high voltage power transmission cables. It is essential for a filler compound to retain both its flexibility and its adhesiveness in order to be satisfactory. If the compound becomes brittle, it will separate easily from an adjacent face of the material or fracture as the result of expansion and contraction of the cable.

The filler compound of this invention retains its flexibility and adhesiveness so that it prevents the cable, with which it contacts, during qualification testing.

For use between the outer interstices of the stranded conductor and the conductor shield or insulation and between the metallic shield and the cable core, the filler material of this invention also retains its resistivity. The volume resistivity of the filling compound applied, as above described, preferably does not exceed 50,000 ohm-centimeters, a value established by the cable industry for semi-conductive material used in cables.

The filler material of this invention is not intended as a replacement for the conductor shield 42 or the insulation shield 46. Its primary purpose is to provide an adhesive filler that sticks to the conductor and to the inside surface of the conductor shield 42. If the conductor is stranded, as is usually the case, then the filler of this invention eliminates voids in spaces between the strands of the conductor. This filler material is also used to provide an adhesive layer between the insulation shield 46 and the metal shield 48. By having these adhesive layers, any migration of water lengthwise of the cable is prevented.

Figure 3:
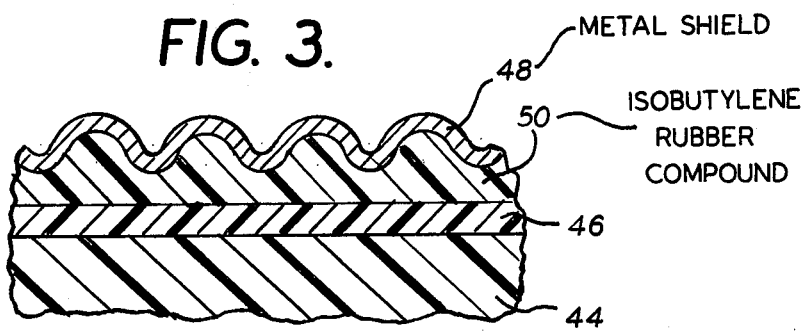
FIG. 3 is an enlarged sectional view taken on the line 3—3 of FIG. 2.

Referring to FIG. 3, the filler compound 50 is shown adhered to the insulation shield 46 and also adhered to the inside surface of the metallic shield 48. The corrugations of the shield 48 are preferably circumferential. It is intended that the filler compound fill the entire space between the metallic shield 48 and the cable core.

Since the filler compound of this invention is semi-conducting, it could be used to replace the conductor shield and/or the insulation shield; though not primarily intended for such use. If it is to be used to replace the conductor shield or insulation shield, then the filler material must be applied in such a way that an excess of the material surrounds either the conductor or insulation for a radial distance on all sides equal to the thickness of a semi-conducting shield that it replaces.

The preferred embodiment of this invention has been illustrated and described, but changes and modifications can be made and some features can be used in different combinations without departing from the invention as defined in the claims.

What is claimed is:

1. A high voltage, power transmission cable including a conductor surrounded by insulation material, a filler in contact with the conductor on the outside thereof and in any interstices of the conductor and between the conductor and the insulation material, the filler being a low molecular weight isobutylene rubber compounded with sufficient electrically conductive carbon to make the filler semi-conducting and of a putty-like consistency with good adhesiveness to the conductor and the insulation material at room temperature, the electrically conductive carbon being greater than 29% by weight of the filler, the filler having retention of its flexibility and adhesiveness in spite of repeated heating and cooling resulting from load cycling of the high voltage power transmission cable, said filler contacting with the conductor and insulating material and preventing migration of moisture lengthwise along the conductor and insulating material, the filler consisting essentially of the isobutylene rubber, and the electrically conductive material and possible trace materials.

2. The cable described in claim 1 characterized by the isobutylene rubber in contact with the conductor being surrounded by insulation material including a conductor shield that is semiconducting and a layer of insulation surrounding and in contact with said conductor shield.

3. The cable described in claim 1 characterized by the filler serving as a semiconducting conductor shield for the cable.

4. The cable described in claim 1 characterized by the electrically conductive carbon constituting from 40 to 150 parts by weight to 100 parts of the polyisobutylene rubber.

5. The cable described in claim 4 characterized by the carbon being from the group consisting of carbon black and graphite, and the proportions of the carbon being from 40 to 50 parts to 100 parts of the polyisobutylene rubber.

6. The cable described in claim 1 characterized by the filler having the physical qualities that make it stick to the conductor and to the insulating material with a moisture-proof bond that retains its adhesiveness, consistency and resistivity after long-term oven aging at 130° C; that retains its moisture resistance after long-term water immersion at 80° C; and that has a drip point above 121° C; and that is compatible with the other cable materials adjacent to it, the compatibility including an absence of migration into said other materials.

7. The cable described in claim 1 characterized by the conductor being a stranded conductor and the spaces between surfaces of the strands being filled with said filler for preventing moisture migration along the strands in the interior of the conductor.

8. The cable described in claim 7 characterized by the filler extending radially beyond the outer limits of the stranded conductor for a radial distance that is substantially uniform around the full circumference of the conductor to form a semi-conducting conductor shield between the conductor and the inside surface of the insulation, said filler adhering to the insulation with a moisture-proof bond.

9. The cable described in claim 1 characterized by a metal shield on the cable radially outward from said insulation, and an additional coating of the filler in contact with the inside surface of the metal shield and adhering thereto for preventing migration of moisture lengthwise of the cable directly under the metal shield.

10. The cable described in claim 9 characterized by the filler extending radially inward from the metallic shield for a distance sufficient to serve as a semi-conducting insulation shield for the cable.

11. A high voltage, power transmission cable including a conductor surrounded by insulation material, a filler in contact with the conductor on the outside thereof and in any interstices of the conductor and between the conductor and the insulation material, the filler being a low molecular weight isobutylene rubber compounded with sufficient electrically conductive carbon to make the filler semi-conducting and of a putty-like consistency with good adhesiveness to the conductor and the insulation material at room temperature, the electrically conductive carbon being greater than 29% by weight of the filler, the filler having the characteristics of retention of its flexibility and adhesiveness in spite of repeated heating and cooling resulting from load cycling of the high voltage power transmission cable, said filler contacting with insulating material, that surrounds the conductor and filler, and preventing migration of moisture lengthwise along the conductor and insulating material, characterized by the filler also containing a processing aid, that is compatible with the insulation material, for reducing the viscosity of the putty-like consistency of the filler to facilitate pumping of the filler when applied by a process that requires pumping.

12. The cable described in claim 11 characterized by the processing aid being from the group consisting of hydrocarbon oil, chlorinated paraffin, and isobutylene liquid plasticizer.

13. The cable described in claim 11 characterized by the filler being an isobutylene rubber from the group consisting of low molecular weight polyisobutylene rubber and low molecular weight copolymer of isobutylene-isoprene rubber.

* * * * *